United States Patent
Bauer et al.

(10) Patent No.: US 6,650,745 B1
(45) Date of Patent: Nov. 18, 2003

(54) METHOD AND APPARATUS FOR DYNAMICALLY EXCHANGING DATA AMONG PARTICIPANTS TO A CONFERENCE CALL

(75) Inventors: Eric Jonathan Bauer, Freehold, NJ (US); Prakash Iyer, Basking Ridge, NJ (US); Yuk-Ming Peter Lam, Colts Neck, NJ (US)

(73) Assignee: Avaya Technologies Corp., Basking Ridge, NJ (US)

( * ) Notice: Subject to any disclaimer, the term of this patent is extended or adjusted under 35 U.S.C. 154(b) by 0 days.

(21) Appl. No.: 09/329,463

(22) Filed: Jun. 10, 1999

(51) Int. Cl.[7] .............................................. H04M 3/42
(52) U.S. Cl. .................... 379/202.01; 370/260
(58) Field of Search ..................... 379/202.4, 203.01, 379/204.01; 370/260, 466

(56) References Cited

U.S. PATENT DOCUMENTS

| | | |
|---|---|---|
| 3,497,631 A | 2/1970 | Pearce et al. |
| 5,374,952 A * | 12/1994 | Flohr ..................... 348/14.08 |
| 5,534,914 A * | 7/1996 | Flohr et al. .............. 379/93.21 |
| 5,563,882 A * | 10/1996 | Bruno et al. |
| 5,689,553 A | 11/1997 | Ahuja et al. |
| 5,963,864 A | 10/1999 | O'Neil et al. |

FOREIGN PATENT DOCUMENTS

EP      0 805 582 A2    11/1997

* cited by examiner

*Primary Examiner*—Creighton Smith
(74) *Attorney, Agent, or Firm*—Ryan, Mason & Lewis, LLP

(57) ABSTRACT

A media exchange monitor is disclosed that selectively (i) introduces a mixer into a two-party call when the two-party call becomes a conference call (ad-hoc conference), and (ii) removes the mixer when one or more conference call participants drop out, leaving only two participants behind. When a party to a two-party call requests to convert the call into a conference call, the packet telephony system responds to the conference call request by connecting a mixer to service the conference call between the parties. When parties drops out of a conference call, leaving only two parties behind, the mixer is removed from the conference call. In one implementation, the mixer is removed from the conference call only if the two remaining parties can exchange media directly. When the media connection among the parties must be changed to introduce or remove the mixer, the media exchange monitor achieves the desired connectivity by initially querying the parties for their capabilities. Thereafter, the media exchange monitor instructs the parties to establish a direct connection for a two-party call or to connect to the mixer for a conference call. The media exchange monitor processes the results of the capability query to select a compatible compression algorithm.

22 Claims, 6 Drawing Sheets

METHOD AND APPARATUS FOR DYNAMICALLY EXCHANGING DATA AMONG PARTICIPANTS TO A CONFERENCE CALL

CROSS-REFERENCE TO RELATED APPLICATION

The present invention is related to U.S. patent application Ser. No. 09/329,464, entitled "Method and Apparatus for Dynamically Allocating Bandwidth Utilization in a Packet Telephony System," filed contemporaneously herewith, assigned to the assignee of the present invention and incorporated by reference herein.

FIELD OF THE INVENTION

The present invention relates generally to packet telephony systems, and more particularly, to methods and apparatus for exchanging data, or media, among participants to a conference call.

BACKGROUND OF THE INVENTION

Communication networks are used to transfer information, such as data, voice, text or video information, among communication devices, such as computer terminals, multimedia workstations, and videophones, connected to the networks. A network typically comprises switching nodes connected to each other, and to communication devices, by various links. Each link is characterized by a bandwidth or link capacity. Information input from the communication devices to the network may be of any form but is often formatted into fixed-length packets or cells.

Packet-switching network architectures are widely used, for example, in popular local-area network (LAN) protocols, such as Ethernet and asynchronous transfer mode (ATM) protocols. In a packet-switched network, data transmissions are typically divided into blocks of data, called packets, for transmission through the network. For a packet to get to its proper destination, the packet must traverse through one or more network switches or nodes. In a packet-switched network, all transmitted information, including data, voice, text and video information, is handled in the same manner by the network.

Packet telephony systems allow the end-point devices in a two-party call to exchange media, such as voice or video information, directly, as long as there is a common compression scheme supported by both end-point devices. In a conference call, however, media connectivity becomes more complicated, where all devices either exchange media pair-wise directly, or using a media mixer. A media mixer, also referred to as a multiple point controller, redistributes media from one connected device to all other listening devices.

The pair-wise exchange of media among conference participants is relatively straightforward, in that it only requires a device to negotiate a media channel with every other device. The pair-wise exchange of media among conference participants, however, exacts a high penalty on network and CPU processing power in each connected device. The exchange of media among conference participants using a media mixer, on the other hand, conserves both network bandwidth and total CPU utilization, and is generally viewed as the preferred solution in commercial grade private branch exchange (PBX) systems.

While the use of a media mixer to exchange media among conference participants conserves both network bandwidth and total CPU utilization for conference calls, conventional packet telephony systems do not permit a mixer to be added to a two-party call when the two-party call becomes a conference call. In addition, a need exists for a packet telephony system that removes a mixer from a conference call when participants drop out of a conference call, leaving only two participants behind, if the remaining parties can exchange media directly.

SUMMARY OF THE INVENTION

Generally, a media exchange monitor is disclosed that selectively (i) introduces a mixer into a two-party call when the two-party call becomes a conference call (ad-hoc conference), and (ii) removes the mixer when one or more conference call participants drop out, leaving only two participants behind. According to one aspect of the invention, when a party to a two-party call requests to convert the call into a conference call, by bringing one or more additional parties into the call, the packet telephony system responds to the conference call request by connecting a mixer to service the conference call between the parties. When parties drop out of a conference call, leaving only two parties behind, the mixer is removed from the conference call. In one implementation, the mixer is removed from the conference call only if the two remaining parties can exchange media directly. Thereafter, the two remaining parties are prompted to establish a direct media connection, without participation of the mixer.

According to another aspect of the invention, when the media connection among the parties must be changed to introduce or remove the mixer, the media exchange monitor achieves the desired connectivity by initially querying the parties for their capabilities. Thereafter, the media exchange monitor instructs the parties to establish a direct connection for a two-party call or to connect to the mixer for a conference call. The media exchange monitor processes the results of the capability query to select a compatible compression algorithm.

According to a further aspect of the invention, the encoding scheme is selected to optimize for whether the connection is a two-party connection, or a conference call with at least three participants. Thus, if a two-party call becomes a conference call, a new encoding scheme optimized for conference calls is selected. Likewise, if one or more parties drops out of a conference call leaving only two-parties, a new encoding scheme optimized for point-to-point connections is selected.

A more complete understanding of the present invention, as well as further features and advantages of the present invention, will be obtained by reference to the following detailed description and drawings.

DETAILED DESCRIPTION

Figure 1A:
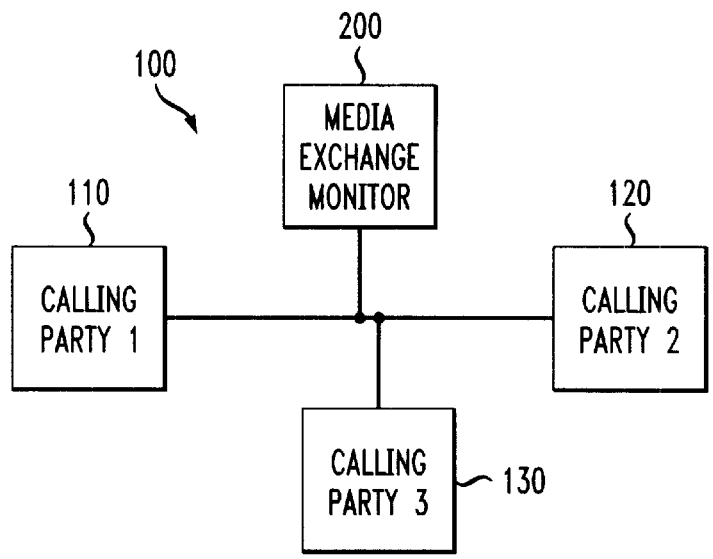
FIGS. 1A and 1B illustrate a packet telephony environment that selectively interconnects two or more parties, where a third party is first added to a two-party call to establish a conference call (FIG. 1A) and then removed leaving only two parties (FIG. 1B)
Figure 1B:
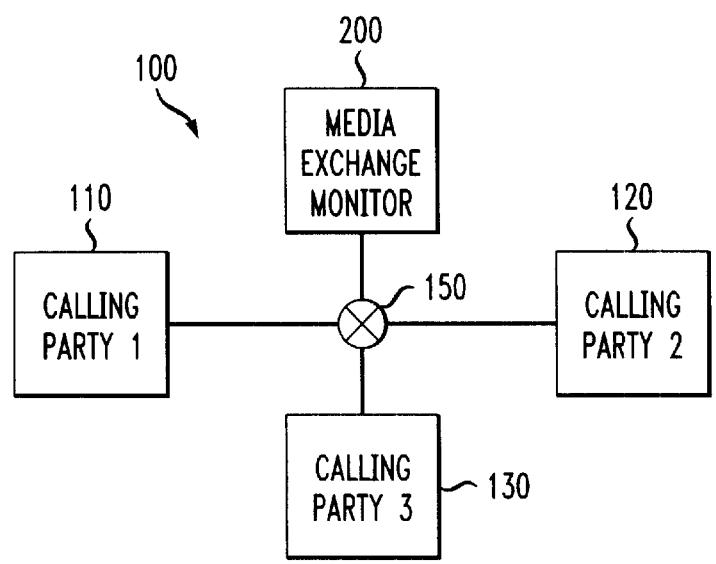
Figure 2:
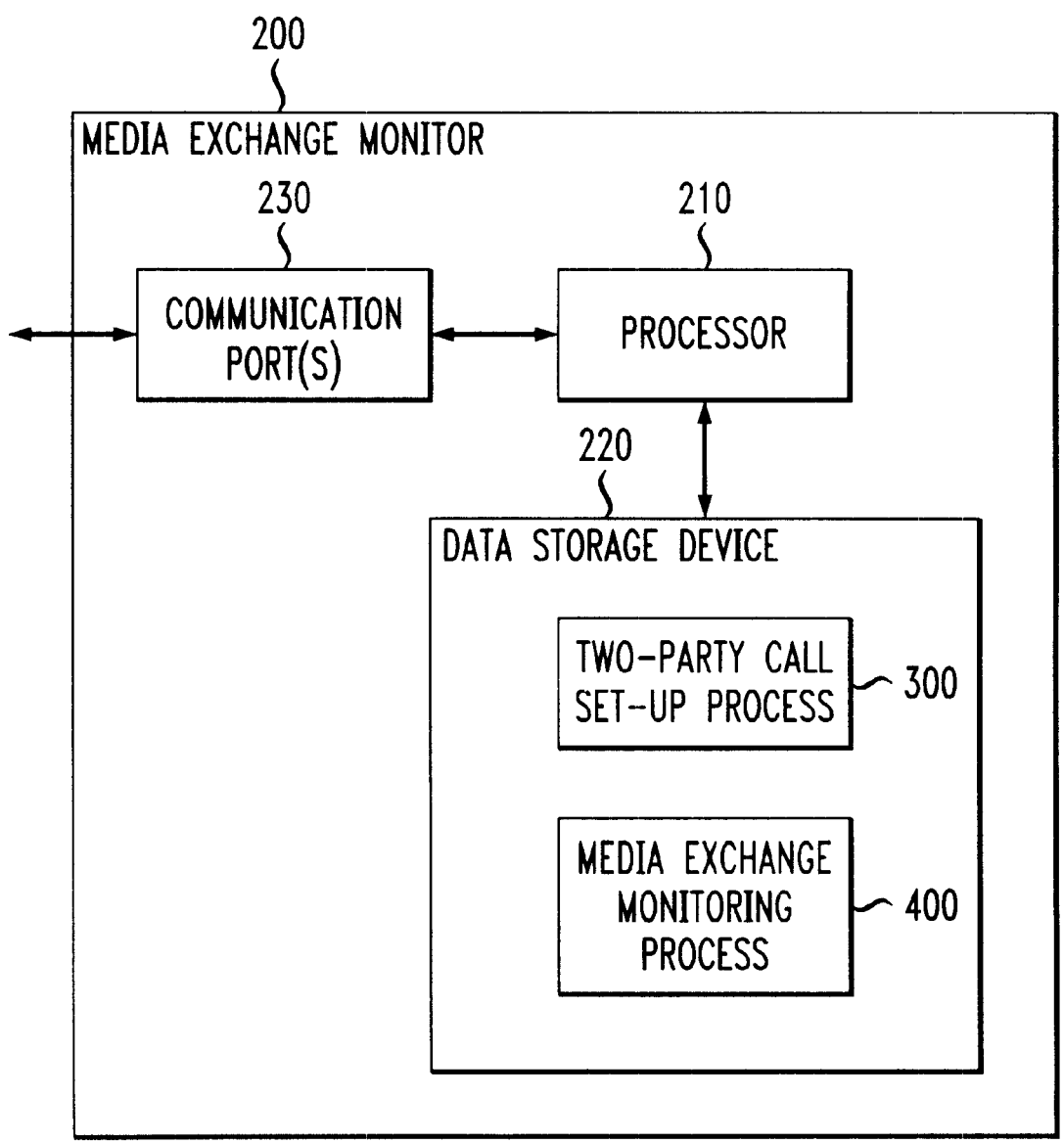
FIG. 2 is a block diagram of the media exchange monitor of FIGS. 1A and 1B in accordance with the present invention.

FIGS. 1A and 1B illustrate a packet telephony environment 100 that selectively interconnects two or more parties 110, 120, 130. A media exchange monitor 200, discussed further below in conjunction with FIG. 2, is provided in accordance with the present invention to selectively (i) introduce a mixer 150 into a two-party call when the two-party call becomes a conference call (ad-hoc conference), and (ii) remove the mixer 150 when one or more conference call participants drop out, leaving only two participants behind. Thus, the media exchange monitor 200 enlists the mixer 150 into service as necessary, and removes the mixer 150 from service when the mixer 150 is no longer needed.

As discussed further below in conjunction with FIG. 4, when the media connection among the parties 110, 120, 130 must be changed to introduce or remove the mixer 150, the media exchange monitor 200 achieves the desired connectivity by initially querying the parties 110, 120, 130 for their capabilities. Thereafter, the media exchange monitor 200 instructs the parties 110, 120, 130 to establish a direct connection for a two-party call or to connect to the mixer 150 for a conference call. The media exchange monitor 200 processes the results of the capability query to select a compatible compression algorithm.

In the configuration of FIG. 1A, the first and second calling parties 110, 120 communicate directly by exchanging media, such as voice or video. The two parties 110, 120 communicate directly, without going through any intervening entity, such as a mixer, for additional processing, such as compression translation. As used herein, a router is not considered to be an intervening entity. In the packet telephony environment 100 of FIG. 1A, the third party 130 is idle.

During the two-party call shown in FIG. 1A, the first party (or device) 110 requests to convert the two-party call into a conference call, by bringing the third party 130 into the call. According to a feature of the present invention, shown in FIG. 1B, the packet telephony system 100 responds to the conference call request by connecting a mixer 150 to service the conference call between the three parties 110, 120, 130. The transition from FIG. 1A to FIG. 1B illustrates the first party 110 initiating a conference call by requesting to add the third party 130 to the two-party call between parties 110, 120.

The packet telephony system 100 introduces the mixer into the two-party call in accordance with the present invention by reconnecting the media (or data) stream of both parties 110, 120 with the mixer 150, in a manner discussed below, and then ringing the third party 130. When the third party 130 answers the call, the media (or data) stream of the third party 130 is connected to the mixer 150 as well. Thereafter, if additional parties are added to the conference call, the media (or data) stream of the subsequent parties can also be connected to the mixer 150.

According to a further feature of the present invention, the mixer 150 (FIG. 1B) is removed from a conference call when a third party 130 drops out of the conference call, leaving only two parties 110, 120 behind. In one implementation, the mixer is removed from the conference call only if the two remaining parties 110, 120 can exchange media directly. Thereafter, the two remaining parties 110, 120 are prompted to establish a direct media connection, without participation of the mixer 150. The transition from FIG. 1B to FIG. 1A illustrates the third party 130 dropping out of the conference call.

FIG. 2 is a block diagram showing the architecture of an illustrative media exchange monitor 200. The media exchange monitor 200 may be embodied, for example, as a workstation or server, as modified herein to execute the functions and operations of the present invention. The media exchange monitor 200 includes a processor 210 and related memory, such as a data storage device 220. The processor 210 may be embodied as a single processor, or a number of processors operating in parallel. The data storage device 220 and/or a read only memory (ROM) are operable to store one or more instructions, which the processor 310 is operable to retrieve, interpret and execute.

As shown in FIG. 2, the data storage device 220 includes a two-party call set-up process 300, discussed below in conjunction with FIG. 3, and a media exchange monitoring process 400, discussed below in conjunction with FIG. 4. Generally, the two-party call set-up process 300 determines whether to introduce the mixer 150 into a two-party call when the two-party call is initially established. The media exchange monitoring process 400 introduces the mixer 150 when a two-party call becomes a conference call and removes the mixer 150 when one or more of the conference call participants drop out, leaving only two participants behind.

The communications port 230 connects the media exchange monitor 200 to the packet telephony environment 100, thereby linking the media exchange monitor 200 to each connected node or party, such as the parties 110, 120, 130.

Figure 3:
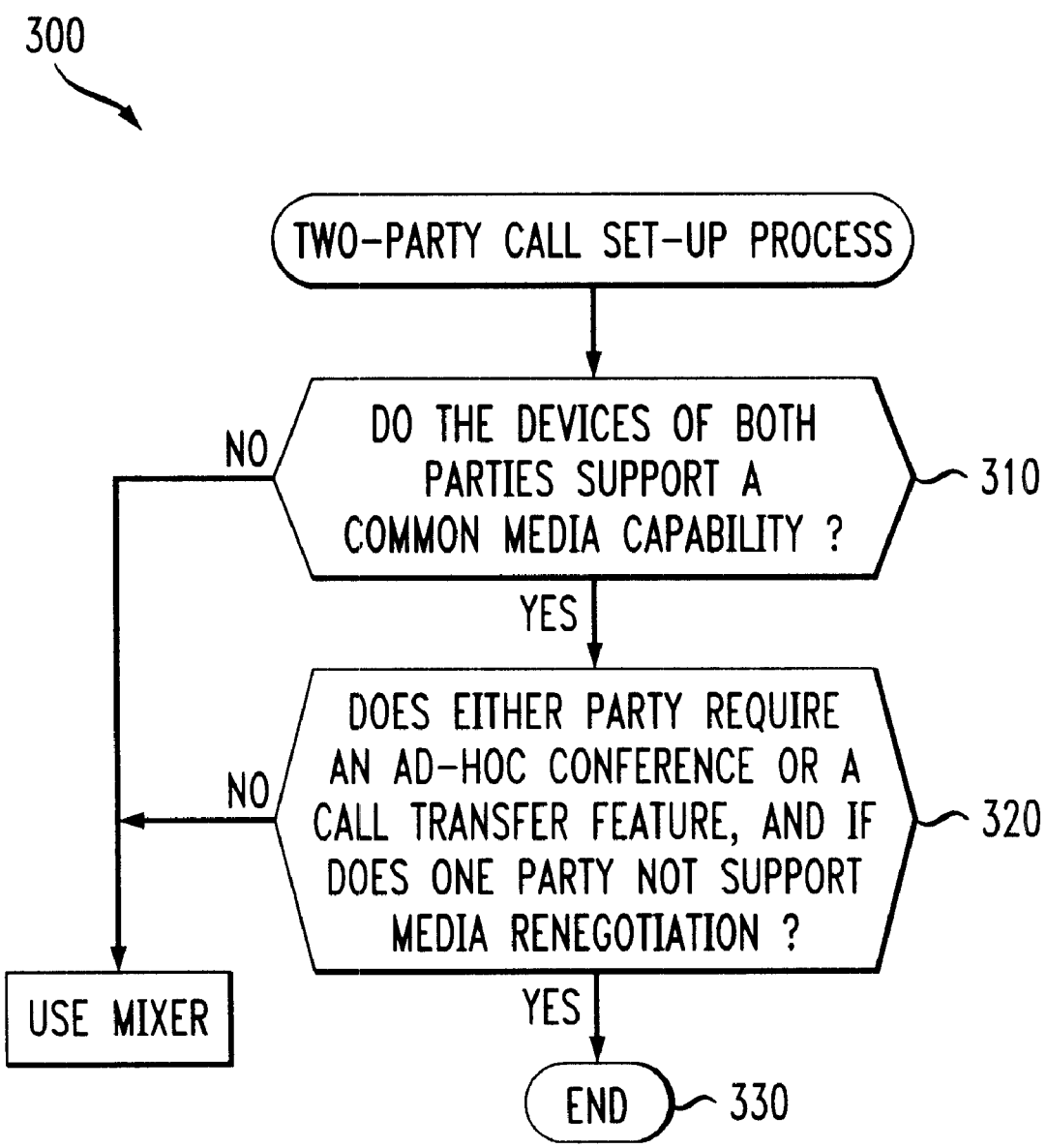
FIG. 3 is a flow chart describing an exemplary two-party call set process implemented by the media exchange monitor of FIG. 2.

As previously indicated, the media exchange monitor 200 includes a two-party call set-up process 300, shown in FIG. 3, to determine whether to introduce the mixer 150 into a two-party call when the two-party call is initially established. During the call setup phase for a two-party call, the media exchange monitor 200 uses previously queried (or recorded) information on the media capabilities and service requirements of the two parties 110, 120 to decide whether the mixer 150 is initially needed. For example, a mixer may be required for a two-party call if the two parties 110, 120 do not support at least one common codec.

Furthermore, the mixer 150 may be included at the beginning of the two-party call, even though not needed initially, if (i) there is a known potential that one of the initial parties 110, 120 may request to convert the two-party call into a conference call, by bringing the third party 130 into the call, or (ii) it is known that the call may be transferred from one device to another, provided that one of the two parties 110, 120 does not support the media renegotiation, discussed further below, in order to redirect the media stream.

As shown in FIG. 3, the two-party call set-up process 300 initially performs a test during step 310 to determine if the devices of both parties 110, 120 support a common media capability. If it is determined during step 310 that the parties 110, 120 do not support a common media capability, then the mixer 150 is used. If, however, it is determined during step 310 that the parties 110, 120 do support a common media capability, then program control proceeds to step 320. It is noted that the media capabilities may be specified, for example, in terms of compression algorithm, packet size, and other attributes, such as an indication of silence suppression.

A test is performed during step 320 to determine if either party requires an ad-hoc conference or a call transfer feature, and if one of the parties 110 or 120 does not support media renegotiation capabilities. If the conditions of step 320 are satisfied, then the mixer 150 is used. If, however, the conditions of step 320 are not satisfied, then program control terminates during step 330.

Figure 4:
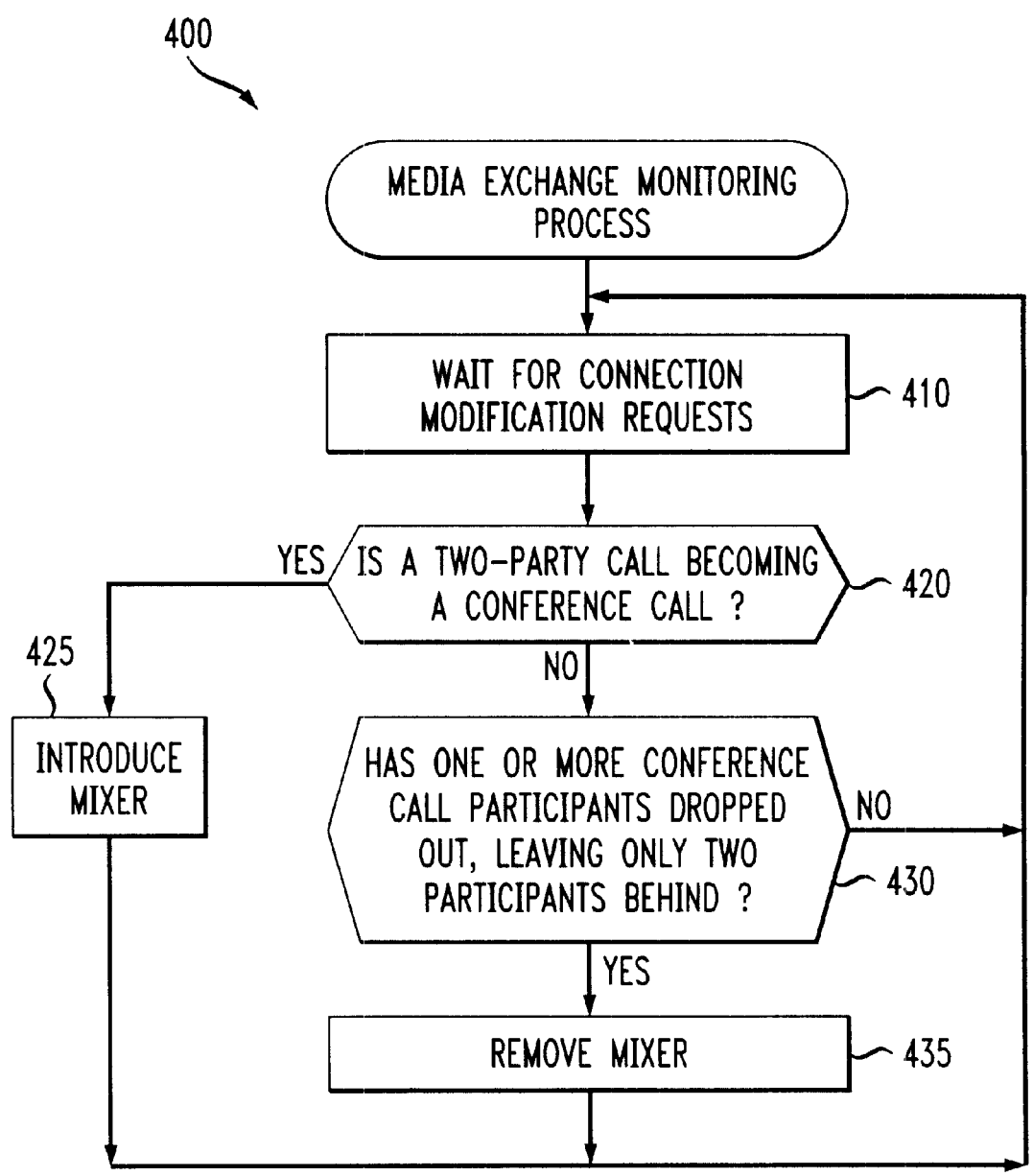
FIG. 4 is a flow chart describing an exemplary media exchange monitoring process implemented by the media exchange monitor of FIG. 2.

As previously indicated, the media exchange monitor 200 includes a media exchange monitoring process 400, shown in FIG. 4, to introduce the mixer 150 when a two-party call becomes a conference call and remove the mixer 150 when one or more of the conference call participants drop out, leaving only two participants behind.

As shown in FIG. 4, the media exchange monitoring process 400 monitors call-signaling requests during step 410. A test is performed during step 420 to determine if a two-party call has become a conference call. If it is determined during step 420 that a two-party call has become a conference call, then the mixer 150 is introduced to the two-party call during step 425. If, however, it is determined during step 420 that a two-party call has not become a conference call, then program control proceeds to step 430.

A test is performed during step 430 to determine if one or more conference call participants has dropped out, leaving only two participants behind. If it is determined during step 430 that one or more conference call participants has dropped out, leaving only two participants behind, then the mixer 150 is removed from the conference call during step 435, and the remaining two parties are instructed to exchange media directly, in a manner discussed below. If, however, it is determined during step 430 that one or more conference call participants has not dropped out, leaving only two participants behind, then program control returns to step 410 for continuous processing.

SIGNALING

Figure 5:
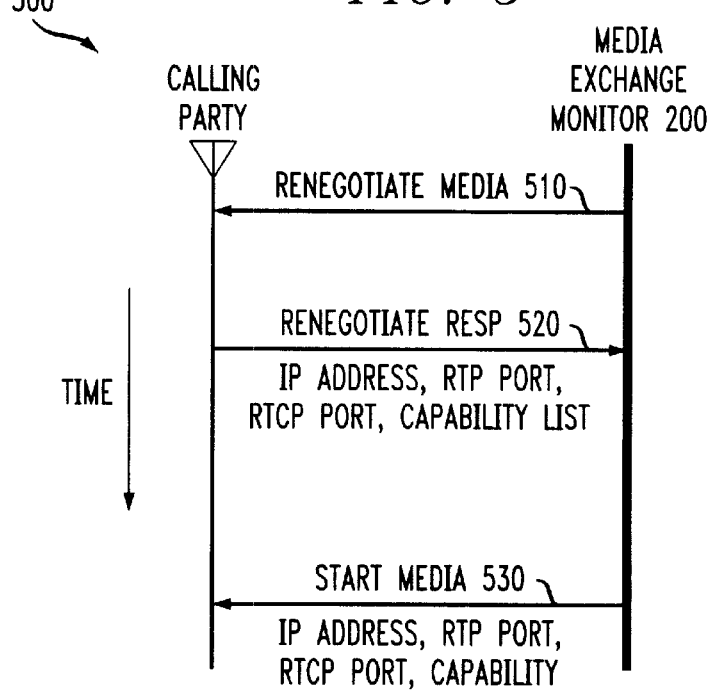
FIG. 5 illustrates a "renegotiate media" dialog sequence between the media exchange monitor of FIG. 2 and a calling party.
Figure 6:
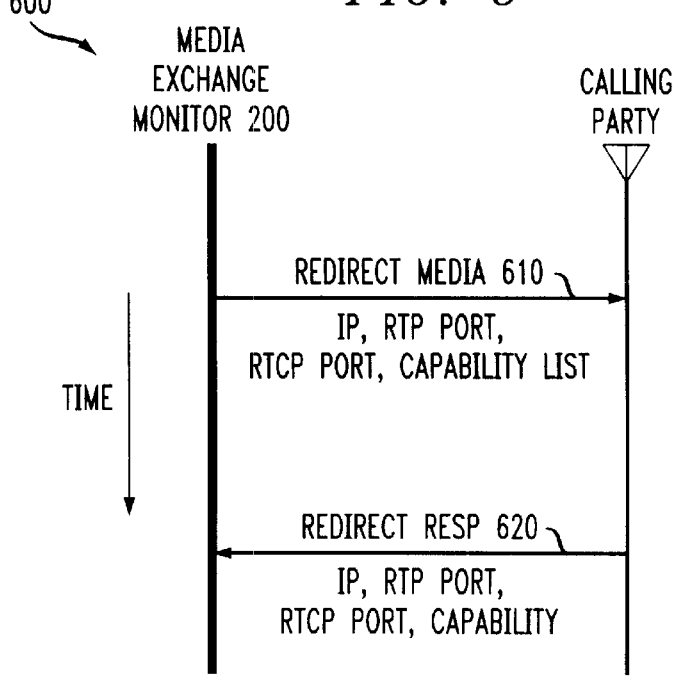
FIG. 6 illustrates a "redirect media" dialog sequence between the media exchange monitor of FIG. 2 and a calling party.

FIGS. 5 and 6 illustrate two dialog sequences between a calling party 110 or 120 and the media exchange monitor 200. The two dialog sequences can be used singly or in combination to establish a media channel between calling parties, or between a calling party and a mixer 150. As discussed further below, a mixer 150 is introduced into a two-party call when the two-party call becomes a conference call (ad-hoc conference) using only the "renegotiate media" dialog sequence of FIG. 5. Likewise, the mixer 150 is removed, when one or more of the conference call participants drop out leaving only two participants behind, using the "renegotiate media" dialog sequence 500 of FIG. 5 and the "redirect media" dialog sequence 600 of FIG. 6.

As shown in FIG. 5, the "renegotiate media" dialog sequence 500 consists of a request 510, labeled "renegotiate media," to a calling party 110 or 120 from the media exchange monitor 200 asking the calling party 110, 120 to assign a channel. The calling party 110 or 120 terminates all existing media activity, and creates a listening port for real-time transport protocol (RTP) packets and another for real-time transport control protocol (RTCP) packets. For a discussion of the RTP and RTCP protocols, see, for example, RTP: A Transport Protocol for Real-Time Applications, Request for Comments No. 1889, available from http://www.cis.ohio-state.edu/htbin/rfc/rfc1889.html, incorporated by reference herein. The expected response 520, labeled "renegotiate resp," gives the IP address of the calling party 110 or 120, the newly created RTP and RTCP ports, and a list of capabilities that the calling party 110 or 120 supports. The calling party 110 or 120 does not begin activity on this channel until it receives a "start media" signal 530 from the media exchange monitor 200, giving information on the choice made among the offered capabilities, the IP address and RTP and RTCP ports of a listener that it should talk to. The media payload of both incoming and outgoing packets is compressed according to the chosen capability.

As shown in FIG. 6, the "redirect media" dialog sequence 600 consists of a request 610, labeled "redirect media" in FIG. 6, to a calling party 110 or 120 from the media exchange monitor 200 giving the calling party 110 or 120 a RTP channel offer (consisting of IP address, RTP port, RTCP port, and a list of media capabilities) from another calling party 110 or 120 or mixer150. The calling party 110 or 120 terminates all existing media activity, and creates a UDP listening port for RTP packets and another for RTCP packets. The expected response 620, "redirect resp," gives the IP address of the device, the newly created RTP and RTCP ports, and one of the capabilities that it chooses from the offered list. The calling party 110 or 120 also starts transmitting RTP packets to the listening ports as specified in the requesting redirect media request, and starts listening for packets at its own listening ports. The media payload of both incoming and outgoing packets is compressed according to the chosen capability.

Figure 7:
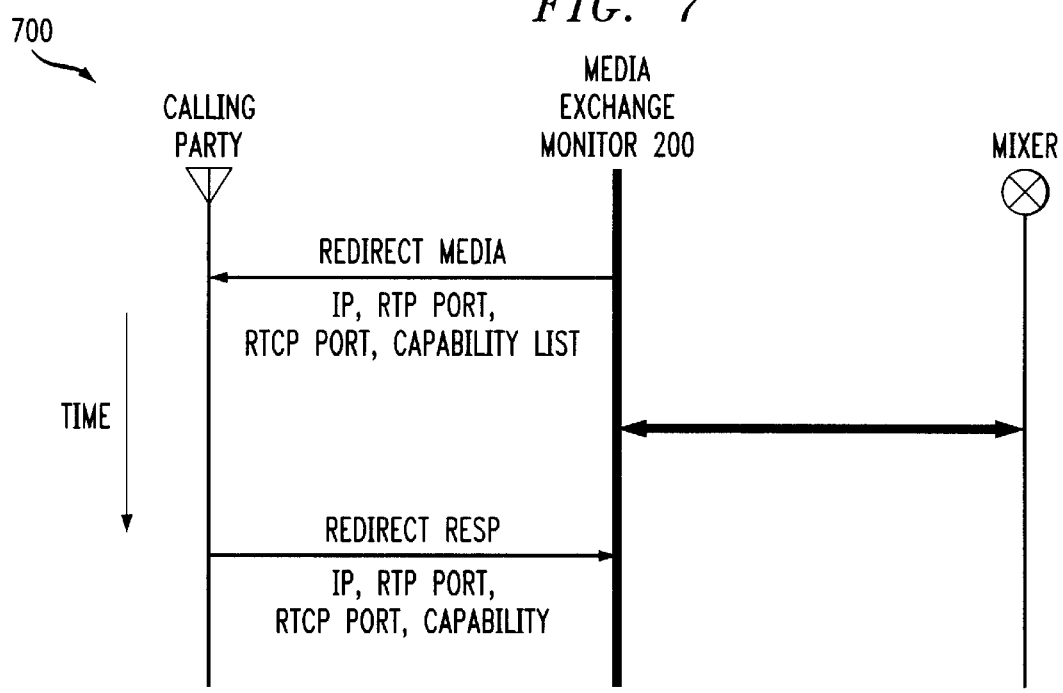
FIG. 7 illustrates the signaling in redirecting media from a calling party to the mixer of FIG. 1B to introduce a mixer 150 into a two-party call when the two-party call becomes a conference call (ad-hoc conference)

As previously indicated, a third calling party 130 is added to a call where two devices are already communicating directly (ad-hoc conference), by obtaining two RTP channels from a mixer 150. Each channel has an IP address, a UDP port listening for RTP packets, another for RTCP packets, and a list of capabilities. The media exchange monitor 200 then directs one of the two devices to redirect its media channel to one of the two newly-created mixer channels, by sending it a "renegotiate media" request 500, as shown in FIG. 7. Upon receiving a response, the media exchange monitor 200 then conveys all necessary information to the mixer 150 to start that channel. Connection from the calling party 130 to the mixer 150 is similarly accomplished. After that, an additional channel is created in the mixer 150 for every party to be added. The protocol followed by these additional calling parties 130 are identical to that of a callee device in call setup.

Figure 8:
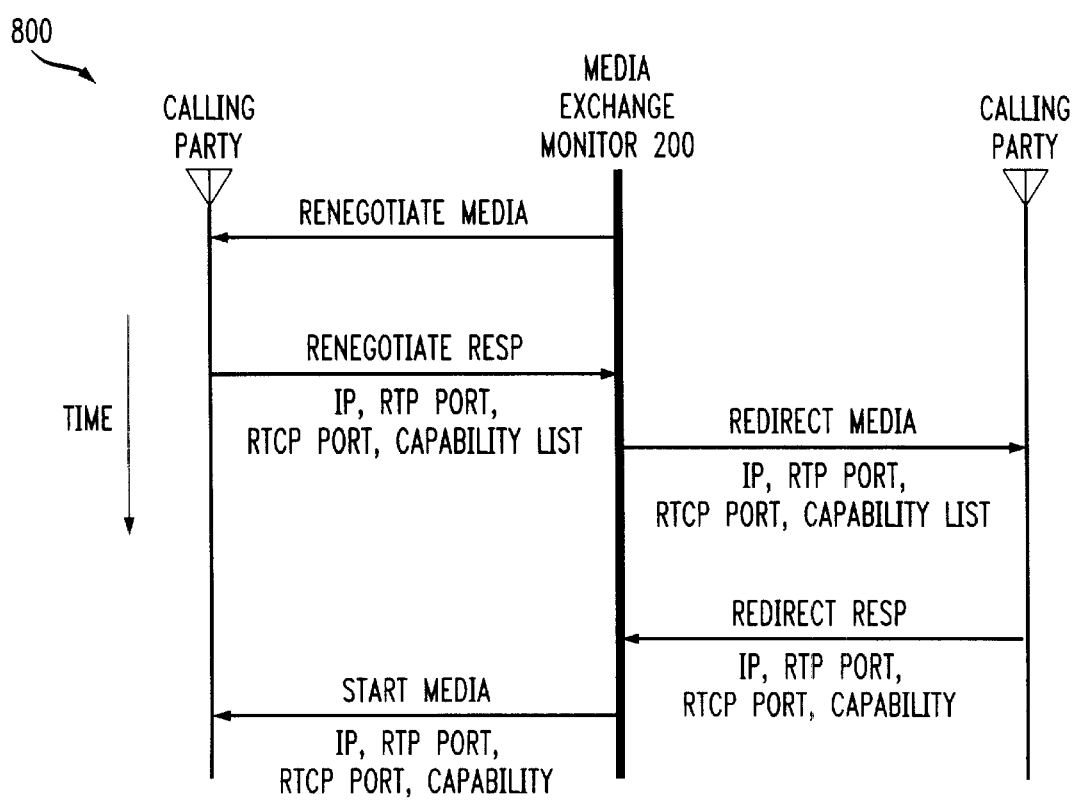
FIG. 8 illustrates signaling in media renegotiation between two calling parties to remove the mixer of FIG. 1B when one or more of the conference call participants drop out, leaving only two participants behind.

As previously indicated, as parties 110, 120, 130 drop off from a conference call until there are only two left, the media exchange monitor 200 decides to remove the mixer 150 from the call, if the remaining two devices can communicate directly. Constructing a direct media channel between the two remaining parties 110, 120 is accomplished by a combination of a "renegotiate media" dialog sequence 500 and a "redirect media" dialog sequence 600, as shown in FIG. 8. The media exchange monitor 200 first completes part of the "renegotiate media" dialog sequence 500, obtaining a media offer from a first calling party, which the media exchange monitor 200 passes to the second calling party in a "redirect media" dialog sequence 600. Response to this request is conveyed back to the first calling party to start its media channel.

It is to be understood that the embodiments and variations shown and described herein are merely illustrative of the principles of this invention and that various modifications may be implemented by those skilled in the art without departing from the scope and spirit of the invention.

We claim:

1. A method for exchanging media among two participants in a call, said method comprising the steps of:
    establishing a connection between said two participants;
    monitoring to determine when a request is received to bring one or more additional participants into said call;
    selecting a new encoding scheme suitable for multiple party connections when said monitoring step determines that a request was received to bring one or more additional participants into said two-party call; and
    introducing a mixer into said two-participant call when said monitoring step determines that a request was received to bring one or more additional participants into said call.

2. The method of claim 1, further comprising the step of querying the parties for their capabilities.

3. The method of claim 1, further comprising the step of instructing the parties to establish a connection to the mixer for a conference call.

4. A method for exchanging media among at least three participants to a conference call, said method comprising the steps of:
    establishing a connection between said participants using a mixer;
    monitoring said connection to determine when one or more of said conference call participants drop out, leaving only two participants; and
    removing said mixer from said conference call when said monitoring step determines that only two participants remain in said conference call.

5. The method of claim 4, further comprising the step of determining if said two remaining participants can communicate directly when said conference call becomes a two-party call before removing said mixer.

6. The method of claim 4, further comprising the step of prompting said two remaining participants to establish a direct media connection.

7. The method of claim 4, further comprising the step of querying the parties for their capabilities.

8. The method of claim 4, further comprising the step of instructing the parties to establish a direct connection for a two-participant call.

9. A system for exchanging media among two participants in a call, comprising:
    a memory for storing computer-readable code; and
    a processor operatively coupled to said memory, said processor configured to:
        establish a connection between said two participants;
        monitor to determine when a request is received to bring one or more additional participants into said call;
        select a new encoding scheme suitable for multiple party connections when said monitoring step determines that a request was received to bring one or more additional participants into said two-party call; and
        introduce a mixer into said two-participant call when said monitoring step determines that a request was received to bring one or more additional participants into said call.

10. The system of claim 9, wherein said processor is further configured to query the parties for their capabilities.

11. The system of claim 9, wherein said processor is further configured to instruct the parties to establish a connection to the mixer for a conference call.

12. A system for exchanging media among at least three participants to a conference call, comprising:
    a memory for storing computer-readable code; and
    a processor operatively coupled to said memory, said processor configured to:
        establish a connection between said participants using a mixer;
        monitor said connection to determine when one or more of said conference call participants drop out, leaving only two participants; and
        remove said mixer from said conference call when said monitoring step determines that only two participants remain in said conference call.

13. The system of claim 12, wherein said processor is further configured to determine if said two remaining participants can communicate directly when said conference call becomes a two-party call before removing said mixer.

14. The system of claim 12, wherein said processor is further configured to prompt said two remaining participants to establish a direct media connection.

15. The system of claim 12, wherein said processor is further configured to query the parties for their capabilities.

16. The system of claim 12, wherein said processor is further configured to instruct the parties to establish a direct connection for a two-participant call.

17. A system for exchanging media among two participants in a call, comprising:
    means for establishing a connection between said two participants;
    means for monitoring to determine when a request is received to bring one or more additional participants into said call;
    means for selecting a new encoding scheme suitable for multiple party connections when said monitoring step determines that a request was received to bring one or more additional participants into said two-party call; and
    means for introducing a mixer into said two-participant call when said monitoring step determines that a request was received to bring one or more additional participants into said call.

18. A system for exchanging media among at least three participants to a conference call, comprising:
    means for establishing a connection between said participants using a mixer;
    means for monitoring to determine when a request is received to bring one or more additional participants into said call; and
    means for removing said mixer from said conference call when said monitoring step determines that only two participants remain in said conference call.

19. A method for exchanging media among two participants in a call, said method comprising the steps of:
    establishing a connection between said two participants with an encoding scheme suitable for two party connections;
    monitoring to determine when a request is received Lo bring one or more additional participants into said call; and
    selecting a new encoding scheme suitable for multiple party connections when said monitoring step determines that a request was received to bring one or more additional participants into said two-party call.

20. A method for exchanging media among at least three participants to a conference call, said method comprising the steps of:

establishing a connection between said participants;

monitoring said connection to determine when one or more of said conference call participants drop out, leaving only two participants behind; and selecting a new encoding scheme for said connection between said two remaining participants suitable for two party connections when said monitoring step determines that only two participants remain in said conference call.

21. A method for exchanging media among two participants in a call, said method comprising the steps of:

establishing a connection between said two participants;

selecting a new encoding scheme suitable for multiple party connections when said monitoring step determines that a request was received to bring one of more additional participants into said two-party call; and introducing a mixer into said two-participant call when a request is received to bring one or more additional participants into said call.

22. The method of claim 21, further comprising the step of removing said mixer from said conference call when one or more of said conference call participants drop out, leaving only two participants.

* * * * *

UNITED STATES PATENT AND TRADEMARK OFFICE
CERTIFICATE OF CORRECTION

PATENT NO. : 6,650,745 B1
DATED : November 18, 2003
INVENTOR(S) : Bauer et al.

It is certified that error appears in the above-identified patent and that said Letters Patent is hereby corrected as shown below:

<u>Title page,</u>
Item [73], Assignee, change "Avaya Technologies Corp." to -- Avaya Technology Corp. --.
Item [57], ABSTRACT,
Line 10, before "out" replace "drops" with -- drop --.

<u>Column 8,</u>
Line 50, after "monitoring" and before "to", insert -- said connection --.
Lines 50-51, after "when" and before "one", delete "a request is received to bring".
Line 51, after "more" and before "participants", replace "additional" with -- of said conference call --.
Line 52, replace "into said call" with -- drop out, leaving only two participants --.
Line 61, after "received" replace "Lo" with -- to --.

<u>Column 9,</u>
Line 7, after "participants" and before "and" delete "behind".

<u>Column 10,</u>
Line 4, after "one" and before "more" replace "of" with -- or --.

Signed and Sealed this

Sixth Day of September, 2005

JON W. DUDAS
*Director of the United States Patent and Trademark Office*